UNITED STATES PATENT OFFICE.

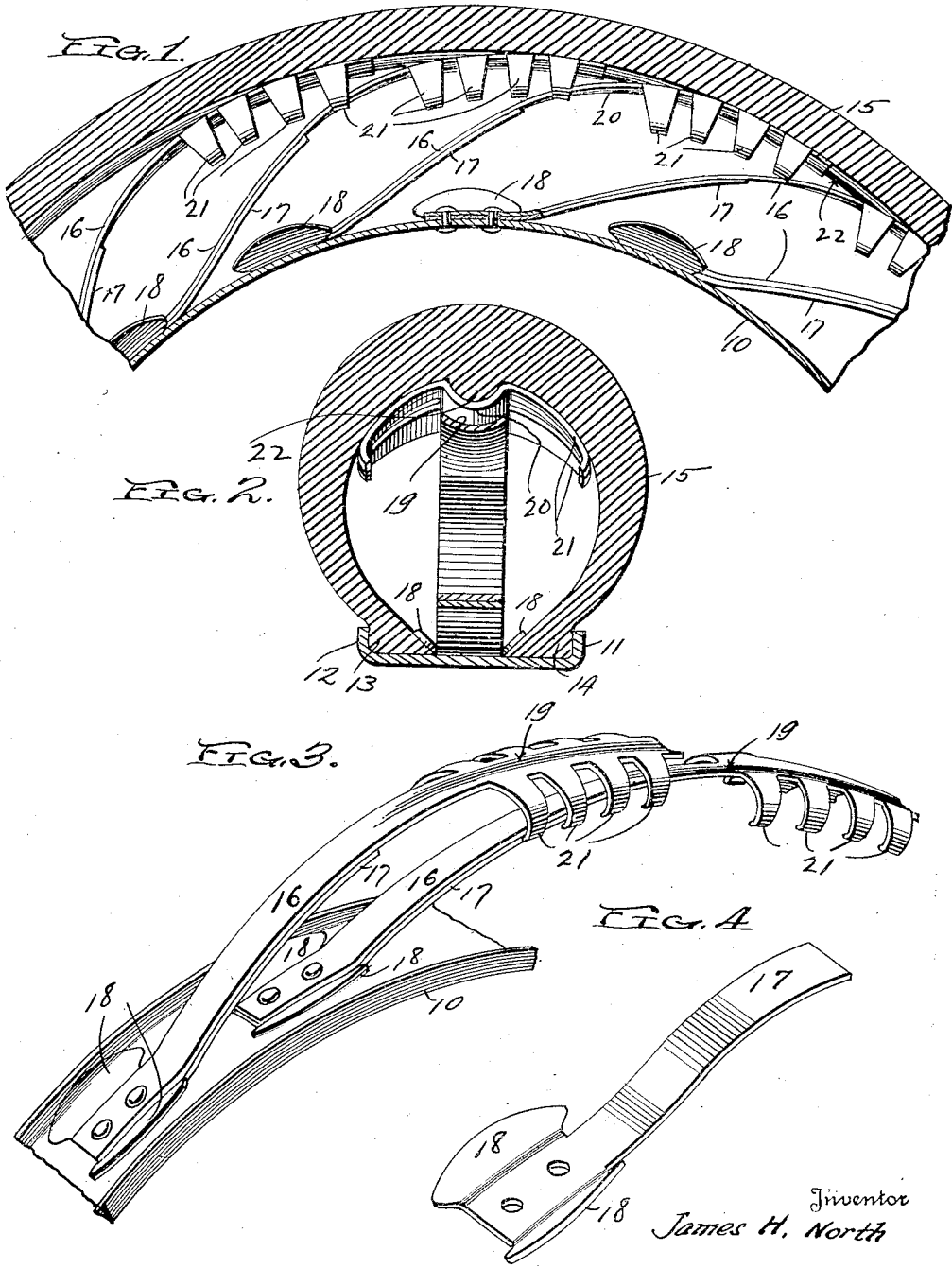

JAMES H. NORTH, OF BLACKWOOD, NEW JERSEY.

TIRE-FILLER.

1,337,528.  Specification of Letters Patent.  Patented Apr. 20, 1920.

Application filed October 4, 1919. Serial No. 328,480.

*To all whom it may concern:*

Be it known that I, JAMES HARRY NORTH, a citizen of the United States, residing at Blackwood, in the county of Camden, State of New Jersey, have invented certain new and useful Improvements in Tire-Fillers; and I do hereby declare the following to be a full, clear, and exact description of the invention, such as will enable others skilled in the art to which it appertains to make and use the same.

This invention relates to vehicle tires and it has for its object to provide a filler for the tire shoe, to be used in the place of the ordinary air tube and in which the shoe will be held normally and yieldably in the same position as if an air tube were used, while the filler itself will be at all times in proper position within the shoe. A further object of the invention is to provide a shoe that will coöperate with the filler to prevent displacement of the latter from operative position.

In the drawings:

Figure 1 is a sectional view of a portion of a tire shoe and of a rim on which it is sustained, the sustaining springs being shown in elevation with the exception of one of the supplemental springs, which has its clamping finger at one side, removed.

Fig. 2 is a transverse section through the shoe, the rim and a pair of sustaining springs and one of an overlying pair of springs, the end of the outer spring of the second named pair being in elevation.

Fig. 3 is a detail perspective view of two of the main sustaining springs with the supplemental sustaining springs that are associated with them, together with the corresponding part of the rim.

Fig. 4 is a detail perspective view on one of the supplemental springs.

Referring now to the drawings, the present filler is associated with a rim 10 having radiating side flanges 11 and 12, between which are received the beads 13 and 14 of the tire shoe 15, the rim being formed separate from the wheel to be applied and removed as desired or being a fixed part of the wheel, as preferred.

At intervals on the outer periphery of the rim 10 and midway between the flanges 11 and 12 are disposed pairs of sustaining springs, the springs of each pair being shown at 16 and 17. The springs 16 are what may be termed the main sustaining springs and each consists of a plate that is bent to present a compound curve extending longitudinally of it. Each spring 16 is riveted, bolted or otherwise secured at one end to the rim 10 and upon the corresponding end of the supplemental spring 17 of that pair and which supplemental spring is thus held securely between the main spring and the rim.

The attached end of each supplemental spring 17 is broadened to produce the laterally directed spring fingers 18, which latter are curved outwardly and away from the rim so as to engage upon the beads 13 and 14 of the shoe 15 and clamp the latter securely to the rim. The fingers extend longitudinally of the supplemental spring at both sides from their portions that connect them with the supplemental springs so as to give an extended bearing surface upon each bead.

The free end of each supplemental spring 17 bears against the inner side of the corresponding main spring, upon which it has sliding movement when the main spring swings toward and away from the rim, at the free end of the spring.

The outer end portion of each of the main springs 16 is curved transversely in its central portion to produce the longitudinally extending channel 19 in its outer surface and the corresponding bead 20 at its inner surface and the bead of one spring slidably engages the rear end portion of the channel of the next spring, in which it is permitted sliding motion upon movement of the outer end portions of the main springs toward the rim 10.

Each of the main springs 16 has extending from the sides of its central channeled portion, the reversely curved lateral fingers 21, the curvatures of which conform to the inner transverse curvature of the tire shoe 15 when the latter is in normal position, it being understood that when the shoe is flattened, the fingers spring outwardly to conform to the assumed curvature of the shoe.

To hold the springs against lateral displacement from position centrally of the shoe, the latter is provided with a bead 22 that is directed inwardly from its tread section and which rests within the channels of the several springs 16. This interlocking engagement of the bead with the channels, of course prevents the springs 16 from rocking laterally with respect to the shoe.

With the above described construction, it will be understood that the shoe will be held distended as if inflated while it will yield to pressure and have such resiliency as will obviate the necessity for the usual air tube. It will be understood that while there is illustrated a carrier for the sustaining springs in the form of a rim, any suitable type of carrier may be used when desired.

What is claimed is:

1. The combination with a carrier of a plurality of spring plates attached at one end to the carrier and overlapped at their free ends one upon another, the free end portion of each spring plate having laterally directed fingers.

2. The combination with a carrier of a plurality of spring plates attached at one end to the carrier and overlapped at their free ends one upon another, the free end portion of each spring plate having laterally directed fingers that are curved to their free ends in the direction of the carrier.

3. The combination with a carrier of a plurality of spring plates attached at one end to the carrier and overlapped at their free end portions one upon another, said free end portions having each an exterior longitudinal channel and interior longitudinal bead, the bead of each plate being slidably engaged in the channel of the plate that it overlaps.

4. The combination with a carrier of a plurality of spring plates attached at one end to the carrier and overlapped at their free end portions one upon another, the free end portions being each provided with laterally directed fingers at both sides and being each bent transversely with a resultant longitudinal channel central of its outer surface and a resultant longitudinal bead central of its inner surface and slidably engaging with the channel of the next plate, each plate being reversely curved from its channel to the extremities of its fingers.

5. The combination with a rim, of a shoe disposed thereon and having an inner peripheral bead extending circumferentially thereof, and spring plates attached at one end to the rim and having their other end portions bearing against the inner periphery of the shoe at both sides of the bead, the intermediate portion of each plate being longitudinally channeled and slidably receiving said bead.

6. The combination with a rim, of a shoe disposed thereon and having an inner peripheral bead extending circumferentially thereof, spring plates attached at one end to the rim and having their other end portions channeled and slidably receiving said bead, and supplemental spring plates in reinforcing relation to the first named plates and having fingers between which and the rim the shoe is held.

In testimony whereof, I do affix my signature in the presence of two witnesses.

JAMES H. NORTH.

Witnesses:
 EDWARD FRANK PINE,
 HOWARD F. SCARBOROUGH.